United States Patent [19]
Hiestand

[11] Patent Number: 5,549,427
[45] Date of Patent: Aug. 27, 1996

[54] DEVICE FOR TRANSFERRING A PRESSURE MEDIUM

[76] Inventor: Karl Hiestand, Mühlweg 2, D-88618 Pfullendorf, Germany

[21] Appl. No.: 349,504

[22] Filed: Dec. 2, 1994

[30] Foreign Application Priority Data

Dec. 2, 1993 [DE] Germany .................. 43 41 167.3

[51] Int. Cl.$^6$ .............. B23C 5/26; B23B 31/30; F01B 31/10
[52] U.S. Cl. .............. 409/233; 92/106; 279/4.01
[58] Field of Search .............. 409/231, 232, 409/233; 279/4.02, 4.01; 92/106; 91/420

[56] References Cited

U.S. PATENT DOCUMENTS

| | | | |
|---|---|---|---|
| 4,863,324 | 9/1989 | Blessing ........................... | 409/233 |
| 5,052,866 | 10/1991 | Bauch et al. ..................... | 409/233 |
| 5,096,347 | 3/1992 | Kumagai et al. ................. | 409/233 |

FOREIGN PATENT DOCUMENTS

| | | | |
|---|---|---|---|
| 1075565 | 10/1954 | France ............................ | 92/106 |
| 3537686 | 4/1987 | Germany . | |
| 2176701 | 8/1987 | Japan ............................. | 229/4.01 |
| 2056608 | 3/1981 | United Kingdom ............. | 92/106 |

*Primary Examiner*—William Briggs
*Attorney, Agent, or Firm*—Robert W. Becker & Associates

[57] ABSTRACT

The device for transferring a pressure medium has a stationary outer component with first pressure medium channels and an inner, rotatably drivable component inside the stationary outer component radially spaced at a distance from the stationary outer component. The inner component has second pressure medium channels. The outer component is connected to the housing of a machine tool and the inner component is connected to the machine spindle. A first and a second intermediate member in the form of an annulus are provided. The first and second intermediate members are positioned fixedly in the space between the inner and the outer components for bridging the distance between them. The first intermediate member has at least one first connecting channel and the second intermediate member has at least one second connecting channel. The at least one first connecting channel connects one of the first pressure medium channels to one of the second pressure medium channels and the at least one second connecting channel connects one of the first pressure medium channels to one of the second pressure medium channels. The first and the second intermediate members are laterally supported at one of the components so as to each define two radially extending sealing gaps and are displaceable relative to the other of the components.

18 Claims, 5 Drawing Sheets

5,549,427

DEVICE FOR TRANSFERRING A PRESSURE MEDIUM

BACKGROUND OF THE INVENTION

The present invention relates to a device for transferring a pressure medium from a stationary outer component into a rotatably driven inner component positioned within the stationary outer component, whereby the components are provided with coordinated pressure medium channels.

From German Offenlegungsschrift 35 37 686 a device of the aforementioned kind for feeding a pressure medium to a hydraulically operated clamping cylinder is known. The outer component in this device is rotatably supported with little play on the inner component so that between the two components an axially extending sealing gap is formed. In this area the pressure medium channels provided within both components are arranged. Furthermore, the two components are directly supported on one another by roller bearings.

This constructively simple pressure medium transferring device has been successful in practice. However, the height of the sealing gap is determined by the two roller bearings. Since the small radial distance must be maintained even under varying operational conditions, it is required to use extremely precisely manufactured roller bearings. The costs for such roller bearings are considerable, but it is still unavoidable that especially at high rpms changes of the sealing gap do occur due to uneven temperature distribution and that the components in the area of the sealing gap may be damaged. Furthermore, due to high bearing friction, caused by the growing sealing gap and resulting in a greater amount of pressure medium flowing through the roller bearing, it is also possible that considerable power losses will occur.

It is therefore an object of the present invention to provide a device of the aforementioned kind for transferring a pressure medium in which the two components are neither directly supported on one another nor supported via roller bearings so that no axially extending sealing gap is present. However, the device should provide a reliable pressure medium transfer even under various operational conditions. Positional changes of the inner and/or the outer components, caused by heat load or other external influences, should be compensated automatically without affecting the transfer of pressure medium or the operation of the device. It is also desired that positional inaccuracies should have no unfavorable effects. The constructive expenditure with which the aforementioned advantages are to be achieved should be minimal; furthermore, no expensive machine parts such as roller bearings should be required so that an economic manufacture and a universal application of the device are ensured.

SUMMARY OF THE INVENTION

The device for transferring a pressure medium according to the present invention is primarily characterized by:

A stationary outer component with first pressure medium channels;

An inner, rotatably drivable component located inside the stationary outer component and being radially spaced at a distance from the stationary outer component so that a space is defined between the inner component and the stationary outer component;

The inner component having second pressure medium channels;

The stationary outer component connected to a housing of a machine tool;

The inner component connected to a machine spindle of the machine tool rotatably supported within the housing;

A first intermediate member in the form of an annulus and a second intermediate member in the form of an annulus;

The first and second intermediate member is positioned fixedly in the space between the inner component and the stationary outer component for bridging the distance between the inner component and the stationary outer component;

The first intermediate member having at least one first connecting channel and the second intermediate member having at least one second connecting channel, wherein the at least one first connecting channel connects one of the first pressure medium channels to one of the second pressure medium channels and wherein the at least one second connecting channel connects one of the first pressure medium channels to one of the second pressure medium channels;

The first intermediate member being laterally supported at one of the inner component and the stationary outer component so as to define two radially extending sealing gaps and being displaceable relative to the other of the inner component and the stationary outer component;

The second intermediate member being laterally supported at one of the inner component and the stationary outer component so as to define two radially extending sealing gaps; and The second intermediate member displaceable relative to the other of the inner component and the stationary outer component.

Advantageously, the first and second intermediate members are supported at the inner component, and are displaceable relative to the stationary outer component.

Preferably, the first and second intermediate members are radially spaced from the inner component and the inner component has radially outwardly extending projections such that the two sealing gaps are formed between the projections and the first and second intermediate members.

In another embodiment of the present invention, the inner component is comprised of at least two parts and has at least one annular groove, wherein the first and second intermediate members engage the at least one groove and are supported at the stationary outer component.

Preferably, between the stationary outer component and the first and second intermediate members an axial gap is present and the first and second intermediate members further comprise sealing rings positioned on opposite sides of each one of the first and second connecting channels so as to seal the axial gap when directly feeding pressure medium from the stationary outer component to the first and second intermediate members.

In a preferred embodiment of the present invention, the device further comprises a first guide member in the form of a first bolt and a second guide member in the form of a second bolt, the first and the second guide members supported at the stationary outer component and extending parallel to a longitudinal axis of the spindle. The first intermediate member is slidably guided on the first guide member and the second intermediate member is slidably guided on the second guide member. Via the first guide member pressure medium is supplied to the first intermediate member and via the second guide member pressure medium is supplied to the second intermediate member.

Advantageously, the stationary outer component has two parts and the first and second bolts are inserted between the two parts. The first bolt has a first supply channel for supplying pressure medium to the first intermediate member and the second bolt has a second supply channel for supplying pressure medium to the second intermediate member. The first and second supply channels each are connected to one of the first pressure medium channels.

Preferably, the first and the second bolts each have a first end face with a seal resting on one of the two parts of the stationary outer component in which the pressure medium channels are located. The first and second bolts have a second end face that is convexly curved.

Preferably, the first and second intermediate members each have a convexely curved outer mantle surface with which the first and second intermediate members rest at the stationary outer component.

In a preferred embodiment of the present invention the device further comprises a first and a second pressure medium collecting chamber positioned at opposite end faces of one of the first and second intermediate members. A return line for the pressure medium is connected to the first and second pressure medium collecting chambers. In an alternative embodiment of the present invention, the first and second pressure medium collecting chambers are positioned at end faces of the first and second intermediate members that are facing away from one another with the return line for the pressure medium connected to the first and second pressure medium collecting chambers.

Advantageously, the device further comprises securing pins inserted into the outer stationary component, wherein the first and second intermediate members have receiving elements in the form of a bore or a groove etc. and the securing pins engage the receiving elements for securing the intermediate members against rotation.

Advantageously, the device further comprises an attachment member for connecting the stationary outer component to the housing. The attachment member is preferably connected to the headstock of the machine tool.

Expediently, the device further comprises an intermediate part for connecting the inner component to the spindle. The intermediate part is preferably a servo device comprising a cylinder connected to the spindle. In an alternative embodiment of the present invention the inner component is directly connected to the spindle.

The stationary outer component may also be directly connected to the housing of the machine tool.

According to the present invention, the stationary outer component is directly connected or connected via an attachment member to the housing of a machine tool and the inner component is positioned at a radial distance to the stationary outer component and connected directly or via an intermediate part to a spindle that is rotatably supported within the housing of the machine tool. Between the stationary outer component and the inner component, in the area of the pressure medium channels provided therein which are coordinated with one another, intermediate members are provided for bridging the radial distance between the inner and outer components. The intermediate members are in the form of an annulus and are fixed against rotation. The intermediate members are provided with at least one channel for connecting the pressure medium channels of the outer component to the pressure medium channels of the inner component and are laterally supported at one of the components, preferably the inner component, via two radially extending sealing gaps so as to be displacable relative to the respective other component.

It is expedient that the intermediate members be positioned at a radial distance to the inner component and that with radially outwardly extending projections of the inner component the radially extending sealing gaps are formed. The inner component is comprised of two or three parts connected to the spindle, the parts including one or a plurality of annular grooves that are engaged by the intermediate members supported at the stationary outer component.

For a direct pressure medium transfer from the stationary outer component into the intermediate members it is suggested to seal the axial gap between the outer component and the intermediate members with sealing rings that are inserted into the intermediate members on either side of the connecting channels provided therein.

In yet another embodiment of the present invention it is suggested to guide the intermediate members on a respective guide member in the form of a bolt which extends parallel to the longitudinal axis of the spindle. The guide members are supported at the stationary outer component. The pressure medium can be supplied via the guide member to the respective intermediate member.

The bolts should be inserted between the two parts forming the outer stationary component and should be provided with a supply channel for the pressure medium introduced via the outer stationary component to feed the pressure medium to the intermediate member. One end face of the bolt should have a seal inserted therein and should rest with this end face at the part of the outer stationary component that is provided with the pressure medium channel. The other end face should be convexly curved.

In order for the intermediate members to be automatically adjustable between the inner and outer components, it is furthermore suggested to provide them with convexely curved outer mantle surfaces with which they are supported at the outer component.

It is advantageous that On both sides of one or of both intermediate members a pressure medium collecting chamber is provided both connected to a common return line. The intermediate members should be secured against rotation with securing pins inserted into the outer stationary component and engaging grooves or bores provided within the intermediate members.

The outer stationary component can be connected in a simple manner with a bell-shaped attachment member or a similar connecting member to the housing, preferably to the headstock of the machine tool, and the inner component can be connected directly to the spindle of the machine tool or to a cylinder of a servo device connected to the spindle.

With a device for transferring a pressure medium designed according to the present invention, it is possible to connect the outer component independent of the inner component to machine tool parts so that an axially oriented sealing gap between the outer component and the inner component is no longer present and the components are no longer supported on one another via expensive roller bearings. Positional changes resulting from heat load and other external influences of the outer and/or the inner components as well as inaccurate positioning resulting from mounting the device thus no longer affect unfavorably the height of the sealing gap. The radial distance between the outer and the inner components is compensated by the intermediate members which in the area of the radially extending sealing gaps are guided within one of the components, but are automatically displaceable axially, radially, or slantedly relative to the axis of the spindle. A high operational safety and reliability at low manufacturing costs are thus ensured.

It is furthermore advantageous that the radially extending sealing gaps between the intermediate members and the component supporting these intermediate members must not be machined in any special manner since the intermediate members essentially adjust themselves automatically. The amount of pressure medium passing through the intermediate members is thus independent of the relative rpm between the two components, i.e., is essentially constant. Furthermore, power losses due to leaking pressure medium are low. Since the pressure medium essentially flows to a smaller or greater extent through the sealing gaps of the intermediate member, these intermediate members are sufficiently lubricated so that operational failures are essentially prevented. Thus, the inventive device which can be simply and economically manufactured provides for a plurality of applications, especially as an attachment at the rearward end of a spindle of a machine tool.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 5.

Figure 1:
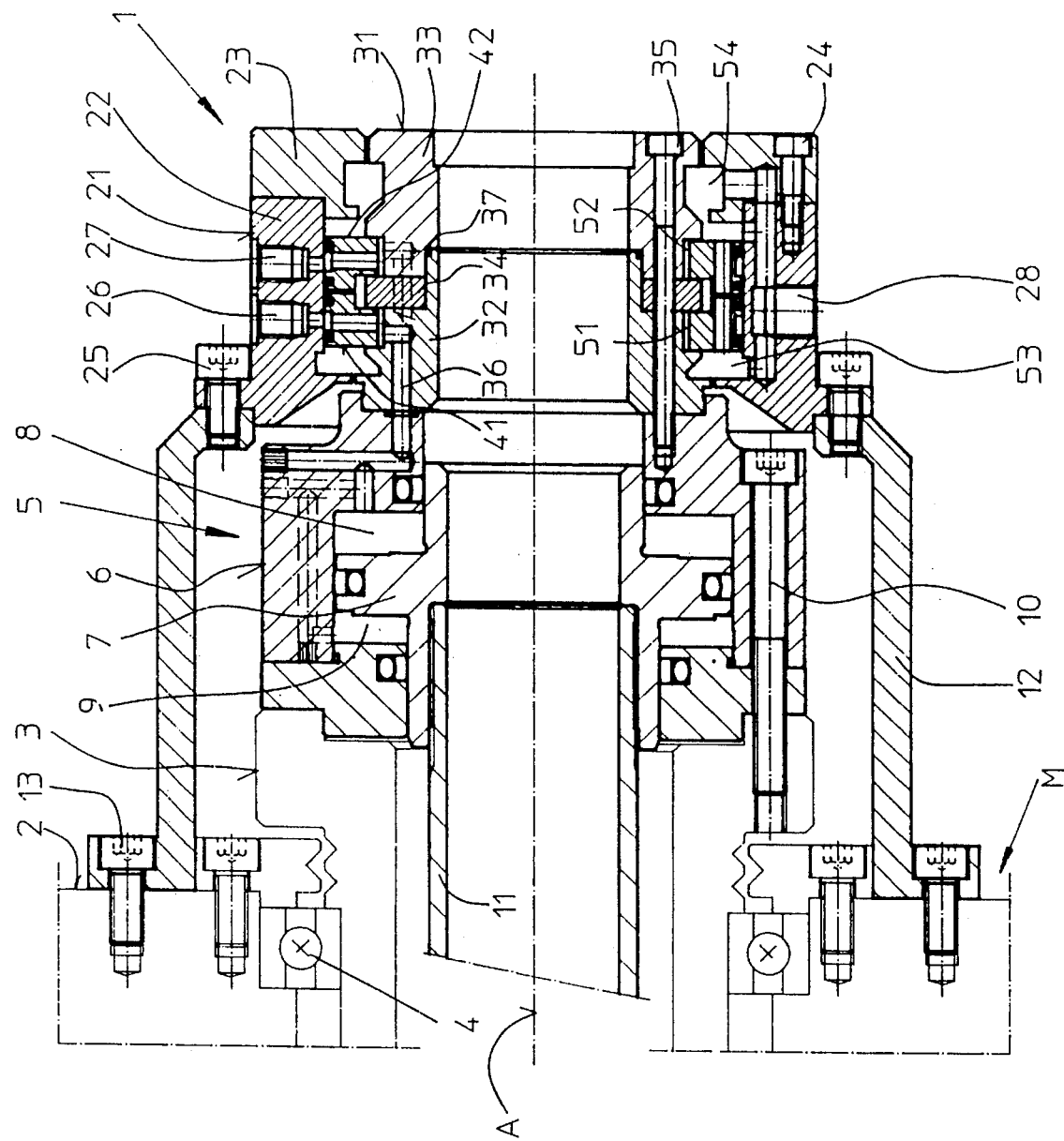
FIG. 1 shows the inventive pressure medium transfer device connected to a machine tool.
Figure 2:
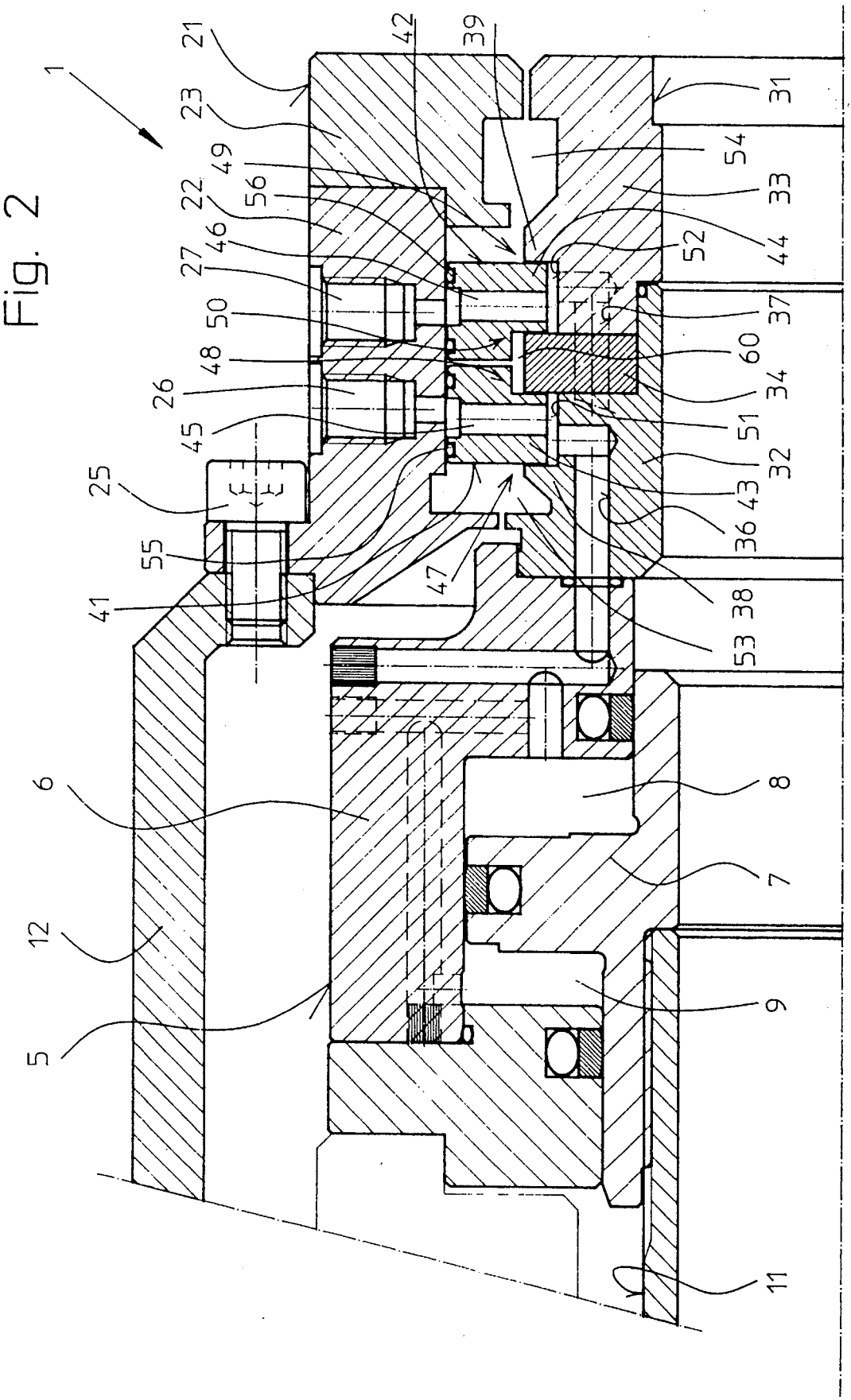
FIGS. 2 and 3 show a detail of the device of FIG. 1 in an enlarged representation.
Figure 3:
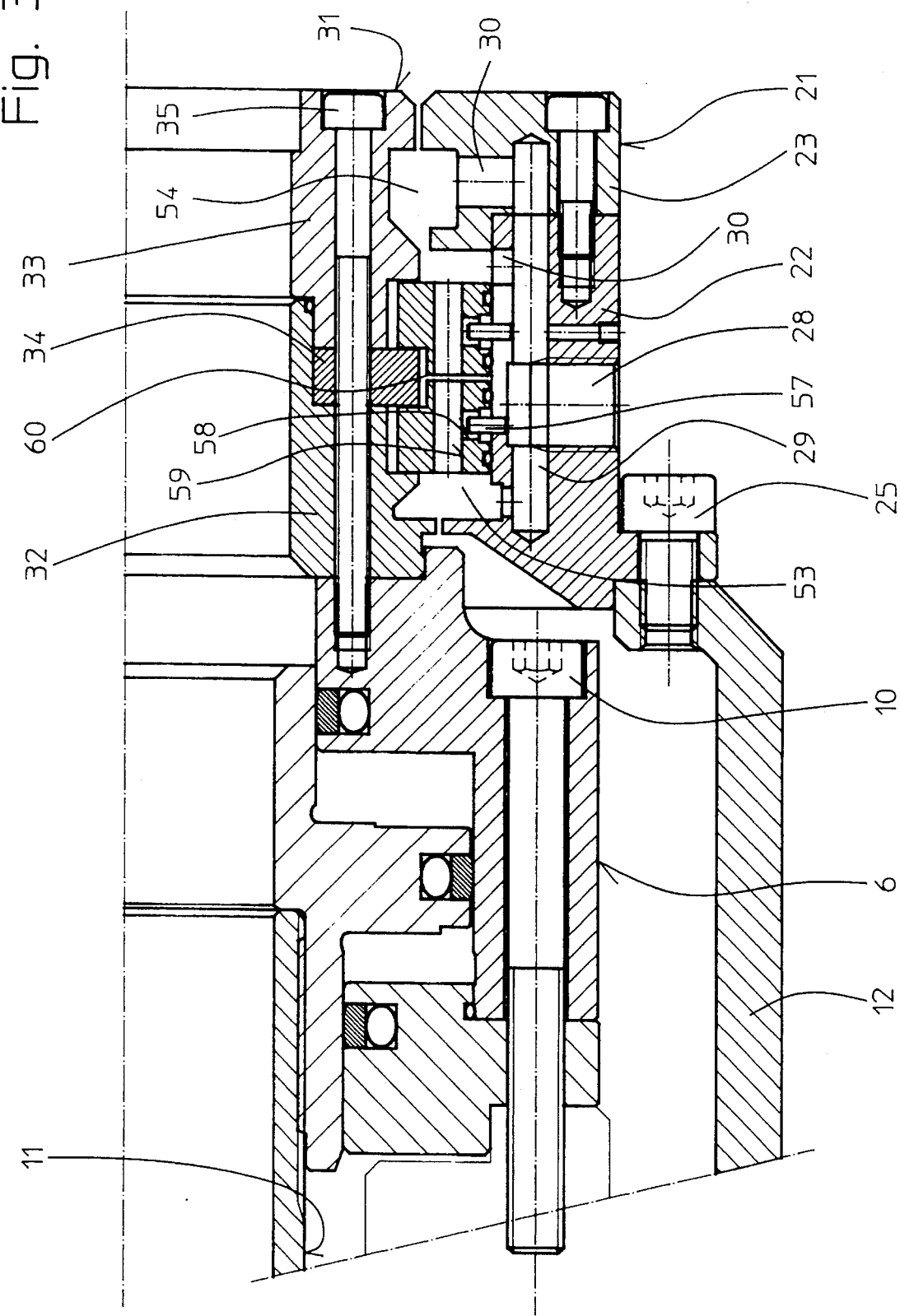
Figure 4:
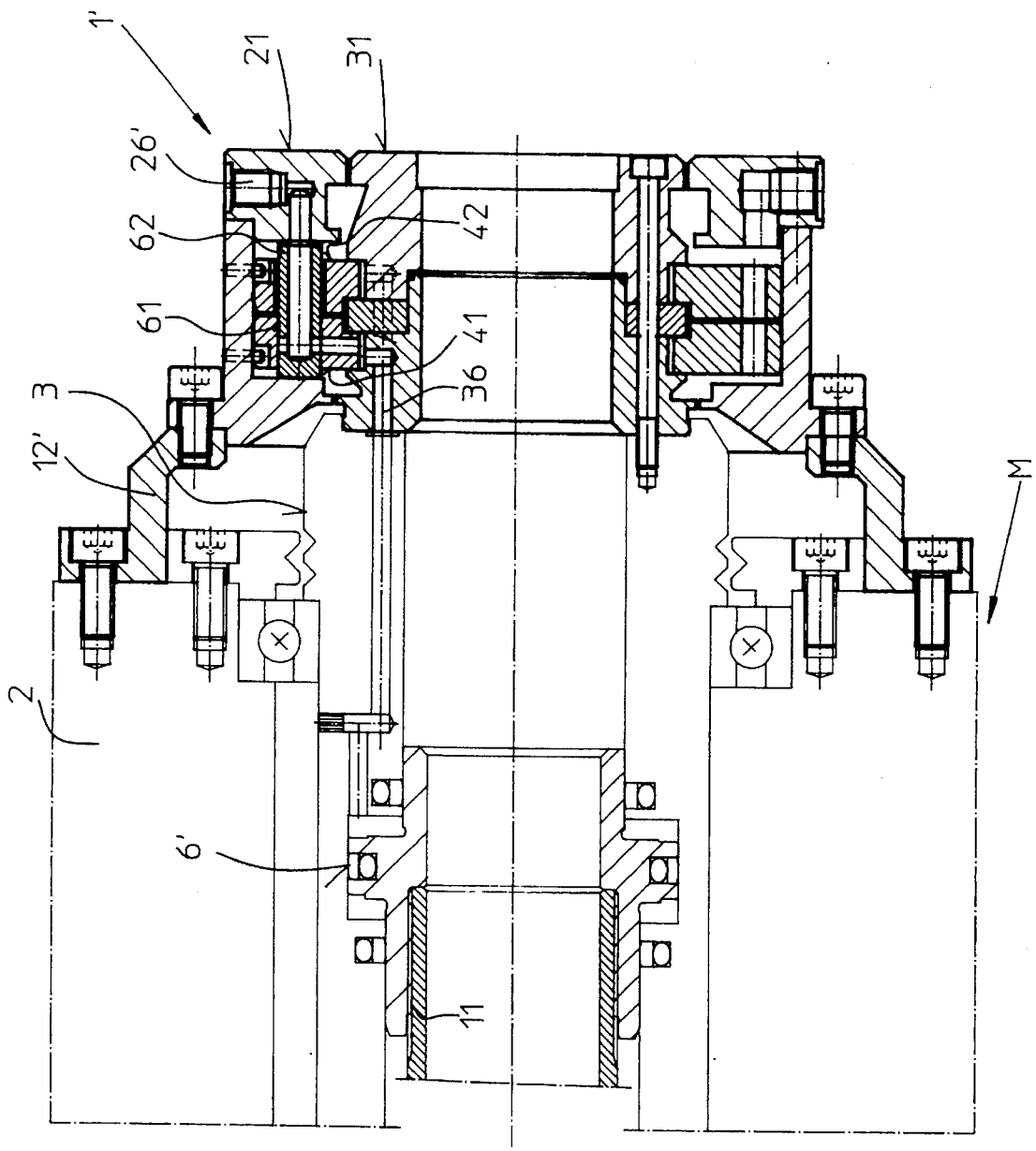
FIG. 4 shows the inventive transfer device of FIG. 1 with a different embodiment of the supported intermediate members and with a servo device integrated into the spindle.
Figure 5:
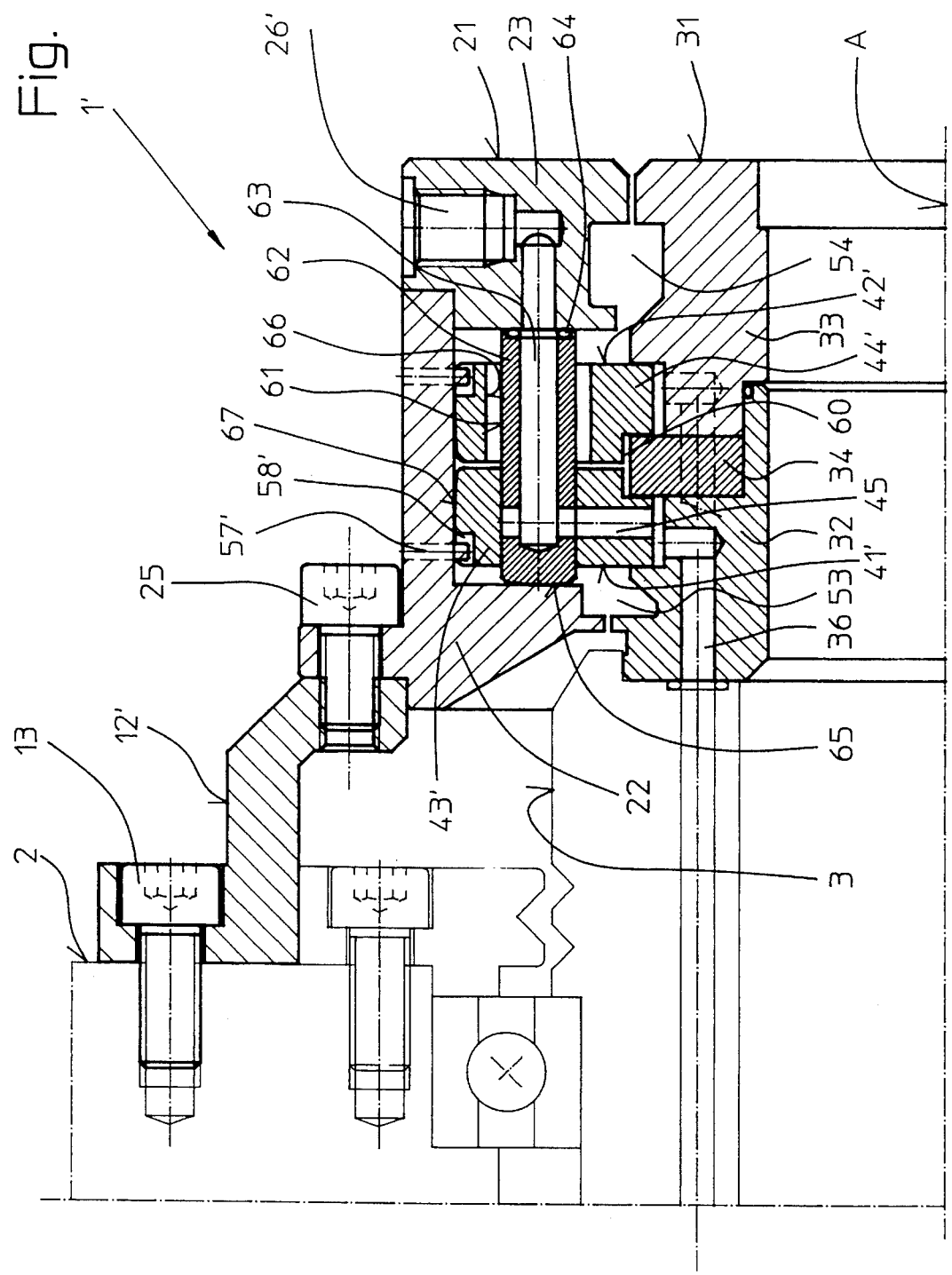
FIG. 5 shows a detail of FIG. 4 in an enlarged representation.

The inventive device 1 and 1' represented respectively in FIGS. 1 and 4 serves for transferring a pressure medium from a stationary outer component 21 into a rotatably driven inner component 31 that is fixedly connected to a servo device 5. In the shown embodiments the stationary outer component 21, to which are connected nonrepresented pressure medium inlet and outlet lines, is connected with a bell-shaped attachment member 12, respectively, 12' to a housing 2 of a machine tool M with screws 13. The inner component 31 rotates together with the machine spindle 3 that is rotatably supported with bearing 4 in the housing 2.

The servo device 5, respectively, 5' in the shown embodiments comprises an adjusting piston 7 that can be loaded with a pressure medium on both ends and is adjustably supported within a cylinder 6. A pull rod 11 is connected to the adjusting cylinder 7 via which, for example, clamping jaws of a chuck connected to the machine spindle 3 can be actuated. When a pressure medium is supplied into one of the pressure chambers 8 or 9 coordinated with the adjusting piston 7, the piston 7 and the pull rod 11 are displaced to the right or to the left. In the embodiment according to FIG. 1 the servo device 5 is fastened with screws 10 to the machine spindle 3. In the embodiment according to FIG. 4, the servo device 5' is integrated into the machine spindle 3.

The outer component 21 is comprised of two parts 22 and 23 that are fastened to one another with screws 24. With further screws 25 the outer component 21 is fixedly connected to the bell-shaped attachment member 12.

The inner component 31 is comprised of three parts 32, 33, and 34. The central part 34 is clamped between the outer parts 32 and 33. With the aid of screws 35 the inner component 31 is fastened to the cylinder 6 of the servo device 5 (FIG. 1) or is directly connected to the machine spindle 3 (FIG. 4). Pressure medium channels 26 and 27, respectively, 36 and 37 are provided within the inner component 31 and the outer component 21 which components 21, 31 are radially spaced from one another. Via the pressure medium channels 26, 27, 36, 37 the pressure medium can be supplied to the pressure room 8 or to the pressure chamber 9 of the servo device 5, depending on the desired movement of the piston 7. The outer component 21 is furthermore provided with a return line 28.

In order to be able to provide a reliable transfer of pressure medium between the radially spaced apart outer and inner component 21, 31, intermediate members 41 and 42 are introduced into the space between the two components 21, 31. The intermediate members 41, 42 are in the form of an annulus 43, 44 and are provided with connecting channels 45, 46 that communicate with the pressure medium channels 26, 27 of the outer component 21 and the pressure medium channels 36, 37 of the inner component 31.

The intermediate members 41 and 42 are inserted into annular grooves 51, 52 provided within the inner component 31 and form with the inner component 31 radially extending sealing gaps 47, 48, respectively, 49, 50. The two parts 32 and 33 of the inner component 31 are provided with radially extending projections 38 and 39 in order to form the sealing gaps 47, 48 and 49, 50. Furthermore, the central part 34 of the inner component 31 projects in the direction of the outer component 21 and forms with the two intermediate pieces 41 and 42 an annular chamber 60 in which the pressure medium flowing via the radially extending sealing gaps 47 or 48, respectively, 49 or 50 can be collected in addition to be collected within the chambers 53 and 54 positioned adjacent to the intermediate pieces 41 and 42. Via branch lines 29 and 30 provided within the outer stationary component 21 as well as via relief bores 59 provided within the intermediate members 41 and 42, the pressure medium flowing through the sealing gaps 47, 48, 49, 50 can reach the return line 28.

The intermediate members 41 and 42 are rotationally fixed. For this purpose, securing pins 57 are provided within the outer component 21 which engage recesses 58 in the form of slotted holes provided within the intermediate members 41 and 42. Furthermore, in the embodiment according to FIG. 1, the outer mantle surface of the intermediate pieces 41 and 42 in the area of the channels 45 and 46 is provided with sealing rings 55 and 56 in order to ensure a substantially loss-free transfer of the pressure medium from the outer component 21 into the intermediate members 41 and 42.

When pressure medium is supplied via the pressure medium channel 26, the pressure medium flows via the connecting channel 45 of the intermediate member 41 into the pressure medium channel 36 of the inner component 31 and from there into the pressure chamber 8 of the cylinder 6 so that the piston 7 is loaded and shifted to the left. Via the radially extending sealing gaps 47 and 48 a smaller or greater amount of the pressure medium will flow into the pressure medium collecting chamber 53 and the annular chamber 60, so that the intermediate member 41 adjusts automatically within the annular groove 51 and the width of the sealing gap 47 and 48 is constantly slightly adjusted. Furthermore, the intermediate member 41, when, for example, a positional change of the outer component 21 occurs, can position itself at a slant; however, the pressure medium transfer is not affected by this movement and the intermediate member 41 is only slightly displaced relative to the outer component 21.

In the pressure medium transfer device 1' of FIG. 4 the intermediate members 41' and 42' positioned between the outer component 21 and the inner component 31 are each positioned on a bolt 62a, 62b of a guide member 61a, 61b. The bolts 62a, 62b are secured between the parts 22 and 23 of the outer component 21 and are provided with a channel 63a, 63b that communicates with the respective pressure medium channels 26', 27' of the outer component 21 and the connecting channel 45', 46' of the intermediate members 41', 42'.

The end face of the bolts 62a, 62b that is facing the pressure medium channel 26', respectively, 27' is provided with an elastic seal 64a, while the oppositely arranged end face 65a, 65b of the bolt 62a, 62b is convexely curved. The outer mantle surface 67a, 67b of the two intermediate pieces 41' and 42' that contact the outer component 21 are convexely curved so that the intermediate members 41' and 42' that are secured against rotation by securing pins 57 inserted into the outer component 21 and received in recesses 58, can automatically adjust their position. The intermediate members 41' and 42' in the form of an annulus 43', 44' are provided with bores 66a, 66b for receiving the guide members 61a, 61b of the respective other intermediate member.

Positional changes of the outer component 21 and/or of the inner component 31 resulting from external influences can thus be automatically compensated since the guide members 61a, 61b can adjust their position radially outwardly and also their orientation relative to the longitudinal axis A of the machine spindle 3.

The present invention is, of course, in no way restricted to the specific disclosure of the specification and drawings, but also encompasses any modifications within the scope of the appended claims.

What I claim is:

1. A device for transferring a pressure medium, said device comprising:

a stationary outer component with first pressure medium channels;

an inner, rotatably driveable component located inside said stationary outer component and being radially spaced at a distance from said stationary outer component so that a space is defined between said inner component and said stationary outer component;

said inner component having second pressure medium channels;

said stationary outer component connected to a housing of a machine tool;

said inner component connected to a machine spindle of the machine tool rotatably supported within the housing;

a first intermediate member in the form of an annulus and a second intermediate member in the form of an annulus;

said first and second intermediate members positioned fixedly in said space between said inner component and said stationary outer component for bridging said distance between said inner component and said stationary outer component;

said first intermediate member having at least one first connecting channel and said second intermediate member having at least one second connecting channel, wherein said at least one first connecting channel connects one of said first pressure medium channels to one of said second pressure medium channels and wherein said at least one second connecting channel connects one of said first pressure medium channels to one of said second pressure medium channels;

said first intermediate member being laterally supported at one of said inner component and said stationary outer component so as to define two radially extending sealing gaps and being displaceable relative to the other of said inner component and said stationary outer component;

said second intermediate member being laterally supported at one of said inner component and said stationary outer component so as to define two radially extending sealing gaps; and said second intermediate member displaceable relative to the other of said inner component and said stationary outer component.

2. A device according to claim 1, wherein said first and second intermediate members are supported at said inner component and are displaceable relative to said stationary outer component.

3. A device according to claim 2, wherein said first and second intermediate members are radially spaced from said inner component and wherein said inner component has radially outwardly extending projections such that said two sealing gaps are formed between said projections and said first and second intermediate members.

4. A device according to claim 1, wherein said inner component is comprised of at least two parts and has at least one annular groove and wherein said first and second intermediate members engage said at least one groove and are supported at said stationary outer component.

5. A device according to claim 1, wherein between said stationary outer component and said first and second intermediate members an axial gap is present and wherein said first and second intermediate members further comprise sealing rings positioned on opposite sides of each one of said first and second connecting channels so as to seal said axial gap when directly feeding pressure medium from said stationary outer component to said first and second intermediate members.

6. A device according to claim 1, further comprising a first guide member in the form of a first bolt and a second guide member in the form of a second bolt, said first and said second guide members supported at said stationary outer component and extending parallel to a longitudinal axis of the spindle, wherein said first intermediate member is slidably guided on said first guide member and said second intermediate member is slidably guided on said second guide member, wherein via said first guide member pressure medium is supplied to said first intermediate member and via said second guide member pressure medium is supplied to said second intermediate member.

7. A device according to claim 6, wherein said stationary outer component has two parts and wherein said first and second bolts are inserted between said two parts and wherein said first bolt has a first supply channel for supplying pressure medium to said first intermediate member and said second bolt has a second supply channel for supplying pressure medium to said second intermediate member, said first and second supply channels each connected to one of said first pressure medium channels.

8. A device according to claim 7, wherein said first and second bolts each have a first end face with a seal resting on one of said two parts of said stationary outer component in which said pressure medium channels are located and wherein said first and second bolts have a second end face that is convexly curved.

9. A device according to claim 1, wherein said first and second intermediate members each have a convexly curved outer mantle surface with which said first and second intermediate members rest at said stationary outer component.

10. A device according to claim 1, further comprising:
 a first and a second pressure medium collecting chamber positioned at opposite end faces of one of said first and second intermediate members; and
 a return line for the pressure medium connected to said first and second pressure medium collecting chambers.

11. A device according to claim 1, further comprising:
 a first and a second pressure medium collecting chamber positioned at end faces of said first and second intermediate members that are facing away from one another; and
 a return line for the pressure medium connected to said first and second pressure medium collecting chambers.

12. A device according to claim 1, further comprising securing pins inserted into said outer stationary component, wherein said first and second intermediate members, have receiving elements selected from the group of a bore and a groove and wherein said securing pins engage said receiving elements for securing said intermediate members against rotation.

13. A device according to claim 1, further comprising an attachment member for connecting said stationary outer component to the housing.

14. A device according to claim 13, wherein said attachment member is connected to a headstock of the machine tool.

15. A device according to claim 1, further comprising an intermediate part for connecting said inner component to the spindle.

16. A device according to claim 15, wherein said intermediate part is a servo device comprising a cylinder connected to the spindle.

17. A device according to claim 1, wherein said inner component is directly connected to the spindle.

18. A device according to claim 1, wherein said stationary outer component is directly connected to the housing of the machine tool.

* * * * *